Figure 1:
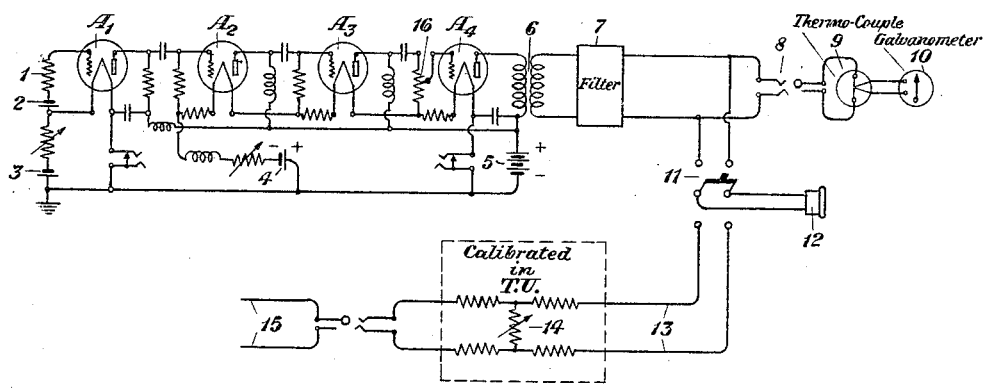

Dec. 30, 1930.   H. NYQUIST   1,786,546
POWER STANDARD DEVICE
Filed April 20, 1928   2 Sheets-Sheet 1

INVENTOR
*H. Nyquist*
BY
ATTORNEY

Dec. 30, 1930.   H. NYQUIST   1,786,546
POWER STANDARD DEVICE
Filed April 20, 1922   2 Sheets-Sheet 2

INVENTOR
*H. Nyquist*
BY
ATTORNEY

Patented Dec. 30, 1930

1,786,546

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

POWER-STANDARD DEVICE

Application filed April 20, 1928. Serial No. 271,544.

This invention relates to methods of and means for producing a power standard and more particularly to arrangements for producing a power standard which will be absolute under different conditions and which will include all pertinent frequencies. The invention furthermore relates to methods of and means for utilizing such an absolute power standard in measuring the intensities of sounds.

In an article in the Bell Laboratories Record, Vol. III, No. VI, of February, 1927, entitled "Thermal agitation of electricity" by J. B. Johnson, it is pointed out that in electrical conductor there are electrons or ions in a state of random motion, which has partly to do with the temperature of the conductor, and that this random motion of the electrons may result in a spontaneous fluctuation of potential between points in the conductor. It is further pointed out in this article that this thermal agitation, this motion of electric charges, this potential fluctuation, does exist and can be measured. It is further pointed out that the effect is most readily detected in a conductor having high electrical resistance and is characterized by a continually changing or fluctuating voltage generated by the resistance itself, unconnected to any other source of potential. In other words, every resistance is a source of random voltage fluctuations, the effects of which can be heard or measured with suitable amplifying apparatus.

The primary object of the arrangements of this invention is to utilize this discovery, that every electrical resistance is a source of electromotive force, in the production of a standard unit of power. Such a standard unit may be utilized to measure noises or sounds.

In the arrangements of this invention, an element, preferably having a high resistance, of known characteristics is arbitrarily chosen. For example, a conductor of known resistance might be selected. This resistance will be in itself a source of random voltage fluctuations caused by the thermally produced electronic activity in the resistance. These voltage fluctuations produced by the thermal activity at a known temperature will now be amplified to a desired degree, such, for example, as to an audible degree by an amplifier of known gain. This combination of an element of known resistance and temperature with an amplifier of known gain and frequency characteristics will produce a standard noise or an absolute unit of power, which may be reproduced at will and utilized for measuring power or the comparative values of intensities of sounds.

The law expressing the thermal electromotive force has been found to be $$E^2 df = 4 kRT df$$

where $E^2 df$ is the average square of the electromotive force due to components lying within the frequency interval $df$; $k$ is the Boltzmann constant; $R$ is the resistance component of the circuit element; and $T$ is the absolute temperature. If these quantities are expressed in volts, cycles per second, ohms, and centigrade degrees, respectively, $k$ has the value $1.37 \times 10^{-23}$. This law has been found to hold accurately for all ranges of frequency and temperature which occur in practice.

It follows that if a circuit element of known resistance and temperature is connected to an amplifier of known gain-frequency characteristics, the power output of the amplifier is a definite quantity which can be computed. Such an impedance element in combination with a suitably designed amplifier may then be taken as an absolute standard of power. The gain-frequency characteristics of the amplifier may be measured by various well known methods to be pointed out hereinafter.

The voltage fluctuations in the resistance have been referred to as having random and erratic characteristics. Accordingly, the wave shape resulting from such fluctuations would be of irregular and erratic form. It is well known that such an irregular wave may be resolved into sine waves of all frequencies. It has been found as expressed in the equation above that the voltage due to the thermal agitation in the resistance is made up equally of all frequencies. Accordingly, the arrangements of the invention have the characteristic that the frequency spectrum may be flat and easily maintained constant. Other objects and features of the invention will appear more fully from the detailed description thereof hereinafter given.

Figure 3:
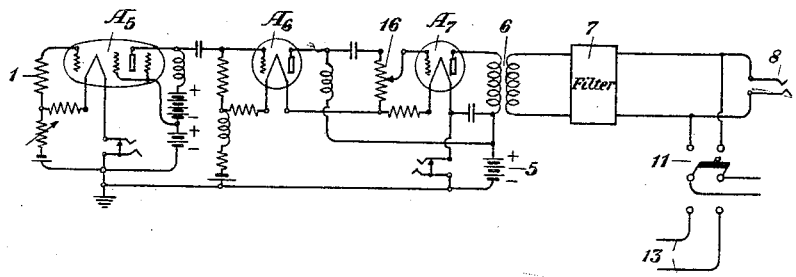
Figure 2:
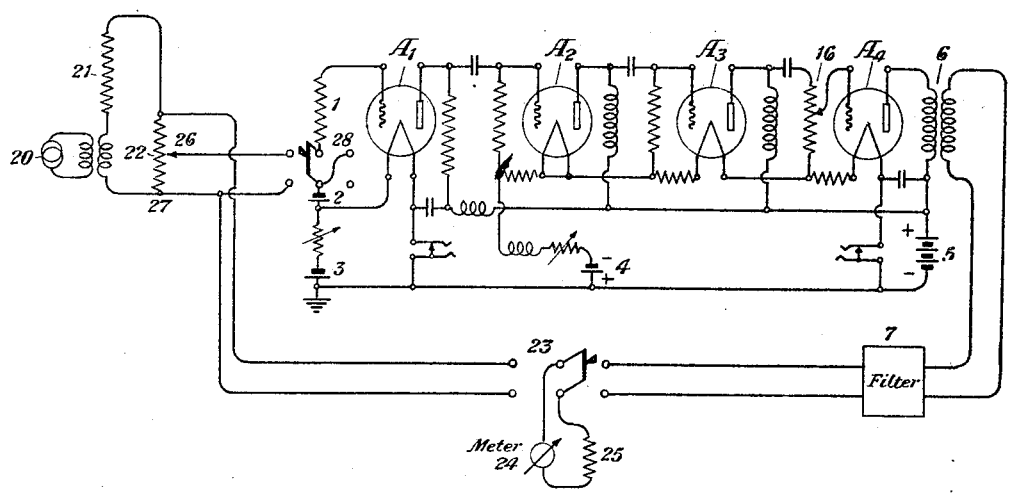
Figure 4:
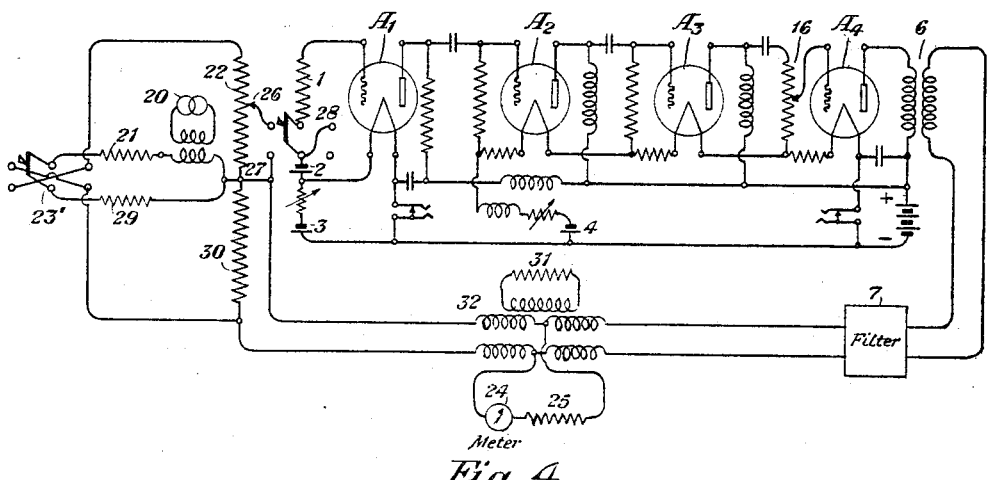

The invention may be more fully understood with reference to the accompanying drawing in the Figures 1, 2, 3 and 4 of which the invention is illustrated. Fig. 1 is a circuit diagram showing the noise standard device and means for measuring the intensities of sounds thereby. Figs. 2 and 4 give circuit diagrams of arrangements for measuring the amplifier characteristics. Fig. 3 is a circuit diagram of a modified form of the noise standard device. Similar reference characters have been utilized to denote like parts in all of the figures.

In Fig. 1 is shown a resistance 1. This will be an arbitrarily chosen resistance preferably of a high value. For example, a conductor of 500,000 ohms resistance might be chosen. As has been pointed out, there will exist in said resistance voltage fluctuations due to the thermally produced electronic activity therein. Or in other words, the thermal agitation of the resistance will cause it to be a source of electro-motive force. To utilize this effect, the resistance 1 is included in the input circuit of amplifying apparatus comprising the vacuum tubes $A_1$, $A_2$, $A_3$ and $A_4$. It is desirable to reduce amplifier noises. Accordingly, separate batteries 2 and 3 are provided for the grid and filament of tube $A_1$. A common source of battery 4 is provided for the grids and filaments of the other tubes. A common plate battery 5 is provided. A potentiometer 16 is provided to adjust the amplification. The output of the amplifier arrangement is connected through the transformer 6 to a filter 7 which may be designed to pass a band of frequencies such as from 0 to 2000, and to cut off the higher frequencies.

To produce the absolute power standard device of this invention the amplifier comprising tubes $A_1$, $A_2$, $A_3$ and $A_4$, must be one of known characteristics. In Fig. 2 is shown an arrangement for measuring the gain of an amplifier. A variable frequency oscillator 20 delivers current through a transformer to a resistance 21 and to a potentiometer 22. A switch 23 is arranged to connect the meter 24 and resistance 25 either to the output of the filter 7 or to the potentiometer 22. The total impedance of the circuit elements 24 and 25 is chosen to match substantially the impedance looking into the amplifier through the filter 7. The circuit elements 21 and 22 are selected so that the impedance looking from the switch 23 toward the potentiometer 22 shall substantially match the impedance of the circuit elements 24 and 25. In order to obtain correct results, the portion of the resistance 22 included between the variable tap 26 and the terminal 27, should be small compared to the value of the resistance 1 and the electromotive force between points 26 and 27 should be so large that the voltage due to thermal agitation in resistance 1 is negligible in comparison therewith. In order to prevent the last stage of the amplifier $A_4$ from overloading during the gain measurement it may be desirable to lower the sliding contact on potentiometer 16 a known amount, when switch 28 is operated to the left for the purpose of connecting the voltage between points 26 and 27 in series with the resistance 1 and battery 2.

In measuring gain, both switches 23 and 28 are first thrown to the left and the output of the oscillator is adjusted to give the meter 24 a convenient deflection. Then the switch 23 is thrown to the right and the sliding contact on potentiometer 22 is adjusted until the same deflection is obtained on meter 24. The voltage ratio corresponding to the gain of the amplifier is equal to the ratio of the resistance of the total potentiometer 22 divided by the resistance of the portion of the potentiometer included between points 26 and 27. Call this ratio Y.

When the apparatus is used as a power standard switch 28 is thrown to the right making a direct connection between battery 2 and resistance 1. Instead of the circuit elements 24 and 25, the output of the amplifier is preferably connected to a thermocouple 9 or a receiver 12, as in Fig. 1, having a resistance $r$ which substantially matches the impedance of the amplifier. Under these conditions, the average square of the electromotive force of thermal agitation in resistance 1, due to components lying within the frequency interval $df$, is $$4kTRdf$$

The average square of the internal voltage acting in the output circuit of the amplifier for components within this frequency range is $$4kTRY^2df$$

The power delivered within this frequency range to the load $r$ is $$\frac{kTRY^2df}{r}$$

The total power delivered to the load, $r$, is $$\frac{kRT}{r}\int_0^\infty Y^2df.$$

The integral may be conveniently evaluated graphically if Y is measured at a sufficient number of frequencies.

It is necessary to specify the resistance and temperature of the element 1. The combination of the element 1 of known resistance and temperature with the amplifier of known gain may be utilized as an absolute power standard device. The device as thus used is an absolute or primary standard of power. As shown in Fig. 1 the amplifier output may be connected to the double throw switch 11 which may be connected to a receiver 12, or other device for converting electrical energy into sound. The double throw switch 11 may also connect the receiver 12 to a source of noise to be measured. For purposes of illustration, this source of noise to be measured is shown as a transmission line 15 connected to a circuit 13 in which is provided an adjustable means 14 for introducing loss or gain. The device 14 will be calibrated in some desirable manner, such as in transmission units.

The noise generated by the thermal agitation in the resistance 1 at a known temperature will be amplified to a desired degree, such as to become audible, by the amplifier of known gain. The switch 11 will then be thrown and the receiver 12 connected to the noise standard device. The switch 11 will then be thrown in the reverse direction and the noise on the line 15 will be listened to. The device 14 will then be adjusted to add or subtract gain from the line until the same noise is heard in the receiver for both positions of switch 11. A reading of the calibrated device 14 will then give an indication of the intensity of the sound on line 15 in units of sound as produced by the noise standard device of the invention.

Suppose the amplifier has been adjusted to give a standard unit of power with the resistance at a certain temperature. On some other day the output from the amplifier may change due to temperature or battery fluctuations, and if the standard unit of power is desired, it would be necessary to compute the power due to thermal agitation and remeasure the amplifier. An arrangement is shown in Fig. 1 which eliminates this work. The thermocouple 9 and galvanometer 10 are provided which can be connected to the output of the amplifier at jack 8. With switch 11 open, the potentiometer 16 can be adjusted till the meter 10 gives an arbitrary reading. In this manner, the apparatus can be rapidly adjusted to give the same output as on a previous occasion.

In Fig. 3 is shown a modification of the device of Fig. 1 in that the tube $A_5$ is of the variety utilizing a plate electrode shielded by an additional grid. Such a tube may be utilized because of its high amplification. If a tube of this type is utilized, only two other tubes $A_6$ and $A_7$ of a suitable type are needed. In other respects, the device of Fig. 3 is substantially similar to that of Fig. 1 and no further description thereof will be given.

A transmission distorter may be used in place of filter 7 to get frequency components combined in a predetermined proportion. This may be desirable if it is desired to simulate a certain kind of noise.

In Fig. 4 is shown another arrangement for measuring the gain of an amplifier. A variable frequency oscillator 20 delivers current through a transformer to a resistance 21 and when switch 23′ is thrown to the right to a potentiometer 22. The resistance 30 is equal to the resistance of potentiometer 22 and the resistance 29 is substantialy equal to the total impedance of resistance 21 and oscillator 20, as seen through the transformer. Resistances 21, 22, 29 and 30 are designed so that the impedance looking to the left from the symmetrical hybrid coil 32 is the same for either position of switch 23′ and substantially matches the impedance looking into the hybrid coil from the left. Resistances 25 and 31 and meter 24 are first chosen so that the impedance looking into the hybrid coil 32 from the right substantially matches the impedance looking into the filter 7 from the left. Resistance 31 should be so chosen that there is a conjugate relationship between the impedance to the left of the hybrid coil and the impedance to the right of the hybrid coil. It is desirable that the resistance included between points 26 and 27 be small compared to the resistance 1, and that the electromotive force between points 26 and 27 be not less than the electromotive force due to thermal agitation in resistance 1. This thermal agitation current is present in equal amounts in meter 24 for both settings of switch 23′ and consequently its effect has nothing to do with the proper setting of potentiometer 22. With this method, it is unnecessary to change potentiometer 16 to prevent overloading of the last stage. The method of measurement is the same as for the apparatus of Fig. 2 using switch 23′ in place of switch 23.

While the invention has been disclosed as embodied in certain specific arrangements which are deemed desirable, it is understood that it is capable of embodiment in many other and widely varied forms without departing from the spirit of the invention as defined by the appended claims.

What is claimed is:

1. The method of producing a noise standard which comprises selecting a conductor having an arbitrarily chosen resistance, amplifying the electrical effects of the thermal agitation in said resistance, adjusting the amplification until the effective amplified output current is of an arbitrarily chosen value, and applying said output current to produce a noise.

2. A noise standard device comprising an electrical resistance, an adjustable amplifier connected to said resistance whereby the electrical effect of the thermal agitation in said resistance may be amplified, indicating means for measuring the effective amplified resulting output current, and a responsive noise generating device actuated by said output current.

3. A noise standard device comprising an electrical resistance, an amplifier circuit for amplifying the electrical effect of the thermal agitation in said resistance, said amplifier circuit comprising several stages of amplification and including in the first stage of amplification a vacuum tube with separate grid and filament voltage supply sources, means for adjusting the gain of said amplifier circuit, means for measuring the effective amplified output current in said circuit, and a receiver device connected to said amplifier circuit.

4. A standard source of electrical power of predetermined frequency make-up comprising the combination of a circuit element having random voltage fluctuations therein, an amplifier, and a transducer having predetermined frequency characteristics.

5. An absolute power standard device comprising the combination of an element of definite resistance and definite temperature with an amplifier of definite gain-frequency characteristics.

6. A standard source of acoustical power comprising the combination of a circuit element having random voltage fluctuations therein, an amplifier, and a transducer having predetermined frequency characteristics and a device for translating electrical power into acoustical power.

7. The method of measuring the intensities of sounds which comprises selecting as a standard source a known electrical resistance, amplifying the potential fluctuations inherent in said source to a predetermined degree, converting the amplified potential fluctuations into sound by means of a receiver or other device of predetermined frequency characteristics, and comparing said noise with the noise whose intensity is to be measured.

8. The method of generating power at an absolute reproducible standard value which consists in holding a definite resistance at a definite temperature and amplifying in definite ratio the voltage fluctuations across its terminals due to thermal agitation within the resistance, whereby the amplifier output will be a fluctuating current of substantial definite power.

9. The method of measuring the power of an electric current which consists, first, in generating a standard of power by holding a definite resistance at a definite temperature and amplifying in definite ratio the voltage fluctuations across its terminals due to thermal agitation within the resistance, whereby the amplifier output will be a fluctuating current of substantial definite power, and second, subjecting the given electric current to adjusted gain or loss in a known measurable ratio till the resultant power equals the said standard, whereby the required measure of power in terms of said standard becomes known in the value of said last-mentioned ratio.

10. The method of measuring power which consists in applying the voltage fluctuations of a definite resistance due to thermal agitation to generate a standard of power, and then measuring the power by said standard.

11. The method of generating a composite alternating current of definite power-frequency value over a definite range of frequencies which consists in holding a definite resistance at a definite temperature, and amplifying the voltage fluctuations across its terminals due to thermal agitation within the resistance with the amplification ratio a definite function of frequency, whereby the amplifier output will be a fluctuating current of substantial definite power at each frequency of the frequency range.

12. The method of generating power at a standard value which consists in amplifying the potential fluctuations in a high resistance due to the thermally produced electronic activity therein and manifesting this standard of power in the form of electric current on the output side of the amplifier.

13. The method of producing power at a standard value which comprises amplifying the potential fluctuations across the two terminals of a circuit element due to the inherent electronic activity therein and manifesting the standard of power in the form of electric current on the output side of the amplifier.

14. The method of producing power at a standard value in the form of a composite electric current comprising all frequencies over a certain frequency range which consists in amplifying the electrical effects of the thermal agitation in a standard resistance and manifesting the standard of power in the form of amplified output electric current.

15. A device for generating power of standard value in the form of a composite electric current with the power distributed definitely over a given frequency range, said device comprising a resistance and an over-all amplifier outfit of definite gain-frequency characteristic to take off the voltage fluctuations from the resistance terminals and deliver the desired power currents in the output.

In testimony whereof, I have signed my name to this specification this 18th day of April, 1928.

HARRY NYQUIST.